United States Patent [19]
Millard

[11] 3,780,412
[45] Dec. 25, 1973

[54] METHOD OF PRODUCING CYLINDRICAL COMPONENTS

[75] Inventor: Barry John Millard, Earley, near Reading, England

[73] Assignee: Adwest Engineering Limited, Berkshire, England

[22] Filed: Nov. 16, 1970

[21] Appl. No.: 89,666

[30] Foreign Application Priority Data
Nov. 28, 1969 Great Britain.................. 58,423/69

[52] U.S. Cl........... 29/157.1 R, 29/159.2, 29/470.3, 219/121 EB
[51] Int. Cl...................... B21d 53/10, B23p 15/14
[58] Field of Search..................... 29/157.1 R, 470.3, 29/DIG. 48, 159.2; 219/121 EB

[56] References Cited
UNITED STATES PATENTS
3,473,214 10/1969 Hollander.......................... 29/470.3
3,436,515 4/1969 Sayer........................... 219/121 EM
3,596,046 7/1971 Valleins et al............... 219/121 EB
3,100,333 8/1963 Friend................................ 29/159.2
3,678,557 7/1972 Howard............................. 29/159.2

*Primary Examiner*—Charles W. Lanham
*Assistant Examiner*—D. C. Reiley, III
*Attorney*—Larson, Taylor and Hinds

[57] ABSTRACT

A method of producing cylindrical components, particularly cylindrical components for rotary valves or pinion members, the method comprising initially producing the component in two or more separate parts, preferably heat-treating the separately formed parts, assembling said parts and electron beam welding or friction welding the parts together to form the complete component.

9 Claims, 5 Drawing Figures

3,780,412

PATENTED DEC 25 1973 3,780,412

METHOD OF PRODUCING CYLINDRICAL COMPONENTS

This invention relates to a method of producing cylindrical components for steering mechanisms for motor vehicles, such as hollow cylindrical components for rotary valve or pinion members for use in rack-and-pinion steering mechanisms.

Rotary valves for use in power-assisted steering mechanisms for motor vehicles generally comprise a housing and a rotor which is turnable within the valve housing under the action of a steering shaft. The housing is formed with fluid inlet and outlet ports and the external surface of the rotor is formed with spaced axially extending fluid passages. The valve housing or a sleeve interposed between the valve housing and the rotor is provided in its internal surface with spaced axially extending fluid passages adapted to cooperate with the passages in the rotor to provide a flow path for fluid between selected ports in the housing when the rotor is rotated relative to the housing or sleeve. Thus, for example, there may be provided in the internal surface of the valve housing or sleeve a plurality of axially extending grooves or channels arranged at equally spaced distances from one another. Where a said sleeve is provided, then this may further be provided with a plurality of annular grooves or channels in its exterior surface each arranged to communicate with a port in the housing. Such a valve is described, for example, in British Pat. No. 958,558.

In the conventional method of producing the housing or sleeve for such a valve, the housing or sleeve is counterbored at one or both ends and then broached to form the axially extending grooves or channels therein, such channels or grooves opening into said counterbore(s). Since it is essential that the ends of the grooves or channels be closed and fluid tight, an annular plug is fitted into the or each counterbore to close the ends of the grooves or channels. The or each annular plug has to provide effective sealing of the ends of the grooves or channels and be capable of withstanding fluid pressures of up to about 2000 pounds per square inch. To achieve a sufficiently close fit and a sufficiently accurate seal between the or each counterbore and its annular plug, both the counterbore and plug have to be accurately ground so that the cooperating surfaces thereof are as smooth and close-fitting as possible to provide a leak-tight joint under high pressure.

This conventional method of producing valve housings or sleeves has disadvantages in that a number of precision machining operations are required and this is both time consuming and expensive. There is also substantial wastage due to the number of housings or sleeves which are not up to standard. Moreover it has been found that when valve housings or sleeves are produced in the conventional manner there is a likelihood of the annular plugs becoming displaced so that the ends of the grooves or channels are inadequately sealed.

Similarly, difficulties are encountered when forming a pinion from bar stock, particularly when the pinion is to be intermediate the ends of the finished component, since it is necessary to machine away the metal at each end of the portion in which the pinion teeth are to be cut and to make the pinion of undue length in order to provide for entry and exit of the tooth-cutting tool. However, the two cut-away portions so formed inevitably result in the ends of the teeth being unsupported which, with the undue length of the pinion, limits the amount of torque the pinion can withstand for a given diameter of pinion.

The aim of the present invention is to provide a method which will enable the aforesaid disadvantages and difficulties to be overcome.

To this end the present invention provides a method of producing cylindrical components, the method comprising initially producing the component in two or more separate parts, assembling said parts, and electron beam welding or friction welding the parts together to form the complete component.

At least one of said parts may be heat-treated prior to assembly and welding, particularly if electron beam welding is used, it having been found that the electron beam of electron beam welding means can be accurately focussed and has a very small spread and that accordingly the heat generated thereby is very localised and does not unduly adversely affect the heat treated surfaces of said part(s).

When producing a cylindrical component for a rotary valve, the cylindrical component having spaced axially-extending grooves or channels in a surface thereof, the grooves or channels extending over a part only of the length of the component, the method may comprise initially producing the component in two or more separate parts one of which has said grooves or channels formed therein so as to extend over the full length thereof, assembling said parts, and electron beam welding or friction welding the parts together to form the complete component.

Where said axially-extending grooves or channels extend over an intermediate part only of the length of the component, the component may be formed in three parts, an intermediate part being breeched so as to form spaced axially-extending grooves or channels in the internal surface thereof which extend over the whole of the length of the intermediate part and parts adapted to close the open ends of said grooves or channels being separately produced and being assembled with and welded to the intermediate part. Annular grooves or channels may be formed in the exterior surface of one or more of said parts before assembly and welding of the parts. The parts may be machine finished before assembly and welding.

Where the method of the invention is applied to the forming of a pinion member, the method may comprise forming a pinion part by cutting pinion teeth along the full length of a short length of bar stock, heat-treating the so-formed pinion part, separately forming end pieces for assembling with the pinion part, assembling said parts and electron beam welding the parts together.

The method of the invention may further comprise clamping the assembled separately formed parts together, rotating the clamped assembled parts and electron beam welding the parts together whilst they are rotated. The clamped and assembled parts of a plurality of components may be mounted in a frame and advanced successively past electron beam welding means, whilst being rotated as aforesaid, so that the clamped assembled parts of the different components will be successively welded together.

The welding may be effected in a vacuum chamber under reduced pressure conditions.

The method of the invention will now be described, by way of example, with reference to the accompanying diagrammatic drawings, in which.

Figure 1:
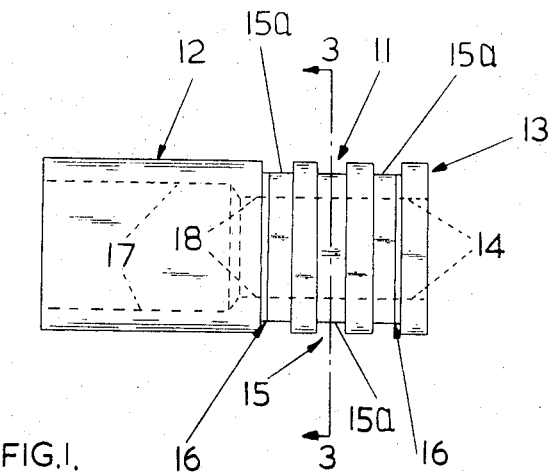
FIG. 1 is a view of a valve sleeve showing some hidden detail.
Figure 2:
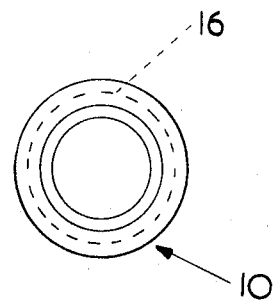
FIG. 2 is an end view of the valve sleeve of FIG. 1.
Figure 3:
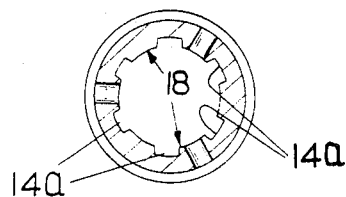
FIG. 3 is a cross section along the line A—A of FIG. 1.

Referring to FIGS. 1 to 4, a sleeve 10 for a rotary valve is formed in three parts, namely an intermediate part 11, a channel sealing end part in the form of a cylindrical shank 12, and a channel sealing end part 13. The part 11 has equally spaced axially-extending slots or channels 14a (FIG. 3) in its inner surface 14 and annular channels 15a in its outer surface 15. Two welds 16 join the shank part 12 and end part 13 to the intermediate part 11.

The part 12 has a bore 17 and counterbore 18 formed prior to assembly of the parts. Likewise the intermediate part 11 and end part 13 both have machined bores formed therein prior to assembly of the parts. The channels or grooves 14a are broached along the inner surface 14 of the part 11. Annular channels 15a were cut in the outer surface 15. The channels 15a also extend around the shank part 12 and end part 13.

The sleeve was manufactured as one of a batch by assembling together and electron beam welding previously machined parts 11, 12 and 13.

Figure 4:
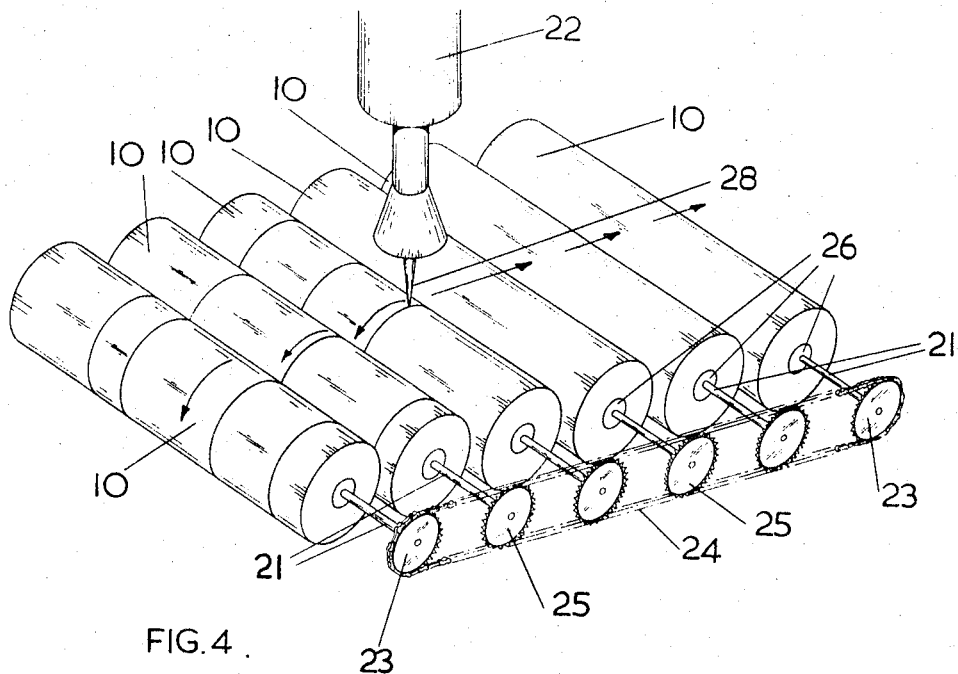
FIG. 4 is a diagrammatic perspective view from above showing the electron beam welding of assembled sleeves.

As shown in FIG. 4, valve sleeves 10 in a batch are passed beneath electron beam welding means 22. Conveyor means comprising gear or sprocket wheels 23 a chain 24 and wheels 25 is provided to both rotate and advance the sleeves 10. A rod 26 passes through each sleeve 10. Suitable clamping means (not shown) hold the assembled shank portion 12, intermediate portion 11 and end part 13 of each valve sleeve together. The parts 11, 12 13 may be assembled within a close fitting outer sleeve to ensure correct alignment of the parts, the sleeve being removed after clamping. The assembled parts of several sleeves 10 may be mounted in a frame (not shown) which is advanced by the conveyor means past the welding means 22. At the same time the conveyor means imparts rotation to the assembled parts through rods 26.

Welding may be effected in a vacuum chamber under reduced pressure conditions.

Figure 5:
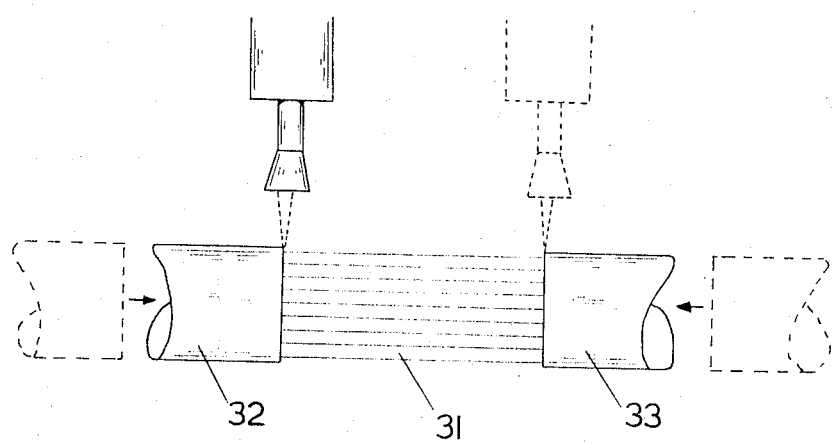
FIG. 5 shows a pinion member and the welding thereof.

Reference will now be made to FIG. 5.

A toothed pinion 31 is machined from a bar stock and then heat treated.

Two support members in the form of solid cylindrical rods 32 and 33 are then brought into abutment with the ends of the pinion 31 and electron beam welded thereto.

As the electron-beam has a very small spread, i.e., it can be focussed very accurately, the heat generated by it is very localised and does not adversely affect the heat treated surfaces of the teeth of the pinion.

The diameter of the two rods is chosen to be at least equal to the diameter of the pinion 31 before the teeth are machined, so that the teeth are supported at each of their ends by the two rods and can thus withstand a greater torque than the same diameter pinion when produced by the prior art method mentioned hereinbefore.

What we claim is:

1. A method of producing a component having a generally cylindrical intermediate portion having axially extending open-topped channels in a surface thereof and generally cylindrical end portions which close the axial ends of said channels, the method comprising forming a first generally cylindrical part with open-topped and open-ended axially extending channels in a cylindrical surface thereof, forming second and third generally cylindrical parts which when assembled with said first part will close the axial ends of said channels, assembling said parts with the first part between the second and third parts and with the second and third parts closing the axial ends of said channels, and electron beam welding or friction welding the parts together to form the component.

2. A method according to claim 1, which comprises heat-treating at least one of said parts prior to assembly and welding.

3. A method as claimed in claim 1 wherein the component is a cylindrical component for a rotary valve, the cylindrical component having spaced axially-extending channels in a surface there of which extend over a part only of the length of the component.

4. A method according to claim 3, which comprises forming said first part by broaching a tubular blank so as to form spaced axially-extending channels in the internal surface thereof, which extend over the whole of the length of the first part.

5. A method according to claim 3, which comprises forming annular grooves in the exterior surface of one or more of said parts prior to assembly of said parts.

6. A method according to claim 1 wherein said component comprises a pinion member having pinion teeth extending axially of an intermediate portion thereof and buttressed by end portions, and wherein said first part is formed by cutting channels along the full length of a short length of bar stock so as to define pinion teeth, and heat treating the so-formed first part prior to assembly and welding, said welding being by electron beam welding.

7. A method according to claim 6, which comprises clamping the assembled parts together, rotating the clamped assembled parts and electron beam welding the parts together whilst they are rotated.

8. A method according to claim 6, which comprises assembling the parts of a plurality of pinion members, clamping the assembled parts of the plurality of pinion members in a frame, rotating the assembled parts and successively passing them past electron beam welding means so that the clamped assembled parts of the different members are successively welded together.

9. A method according to claim 1, which comprises effecting said welding in a vacuum chamber under reduced pressure.

* * * * *